3,399,298
DATA PROCESSOR PROFITABILITY MONITORING APPARATUS
Heather M. Taylor, Philadelphia, Pa. (633 Central St., Framingham Center, Mass. 01701)
Filed June 28, 1965, Ser. No. 467,264
23 Claims. (Cl. 235—92)

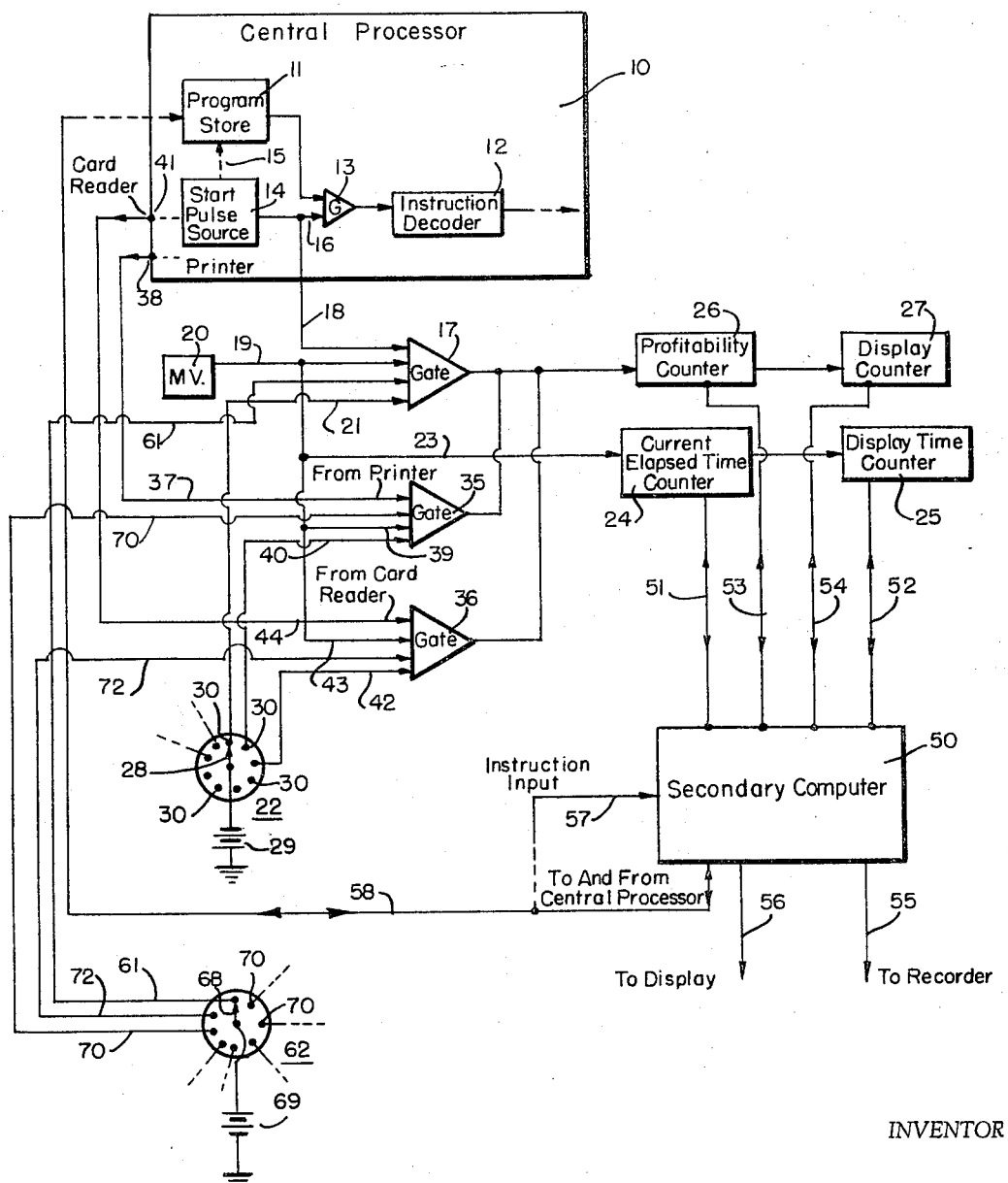

The present invention relates to an apparatus adapted to measure, and in some cases analyze, the operation of a data processor working with any given program, to determine how that program is using the data processor; and is more particularly concerned with apparatuses of the type described arranged to monitor various different portions of a data processor which may come into use during the processing of a quantity of data, to determine the relative operational efficiencies of those various processor portions, thereby to permit an evaluation of the processor profitability to be made, and to provide information permitting appropriate changes to be made in the processor program thereby to increase the overall efficiency of the particular data processing operation. The term "data processor" as used herein is intended to include peripherals as well as the main data processing apparatus.

As is well known to those skilled in the art, any particular data processor can be programmed in a variety of different ways to process a particular quantity of data and to achieve a particular result. As a practical matter, the efficiency of the machine operations for any given data to be processed, depends in large measure upon the program selected for use in the machine. For example, with one particular program, it might be found that the machine is capable of processing a certain quantity of data in a certain time interval, whereas that same machine working with the same data but controlled by a different program may require either a lesser or greater amount of time to achieve the desired results on the same data. Since the operating time of any given machine is an extremely important consideration, economically, it is important that the program selected be one which utilizes all relevant portions of the machine to greatest possible efficiency.

Yet, notwithstanding this fact, no particular attention has been paid heretofore to measuring the relative efficiencies of the data processing components, and persons using processors have relied primarily upon the skill of the programmers to devise a program which would accomplish a desired result in a minimum of time. Such reliance, however, has not often been justified, and has often resulted in the use of programs which do not take full advantage of the capabilities of the particular processor apparatus using that program. This situation has not been particularly the fault of programmers, since, in devising programs, programmers have not been provided with any tools suitable to evaluate any particular program. Moreover, due to the very nature of known data processors, it has been substantially impossible for even highly skilled programmers to anticipate just how the various parts of the data processing apparatus will operate, as to efficiency, during the execution of any given program; and therefore neither programmers nor processor operators have been in a position heretofore to know just how efficient any particular program execution might be.

The difficulties in devising a program which will utilize a machine capability to greatest extent, arises from the various limiting factors which may be present in any given machine. For example, any given data processing apparatus will have a limiting factor involving its card reader, a different limiting factor involving its output printer, etc.; and the limiting factor which may come into play when any particular set of data is to be processed may be different from the limiting factor which comes into play when other data is being processed. In one situation, the limiting factor of the machine may involve the card reader, whereas with other data, the limiting factor may involve the output printer, etc. Even other limiting factors are present in the overall machine; and because of the multiplicity of possible limiting factors, those writing programs for any particular machine, and for any particular data, tend to ignore all such limiting factors and merely write programs which will eventually produce the desired results.

The apparatus of the present invention, recognizing this nature of known machines, and the usual ways in which programs are written, is intended to determine for the first time just when the execution of any particular program may use the machine to less efficiency than is possible, so that appropriate changes can then be made in the program to reduce the machine operating time back toward the particular limiting factor which may be operating for any given set of data.

In order to appreciate the nature of the problem here involved, and solved by the present invention, let us assume that a data processor is being employed to prepare a payroll. It may be found that the data processor, working with one program, can process a quantity of data in a period of, say, ten minutes, whereas the same processor, working with another program achieving the same ultimate objective, may tie up the processor for eleven minutes. The differences in operating time are immediately evident, but it has been substantially impossible heretofore to analyze just where in the program the machine has been caused to operate at less than maximum efficiency. It has accordingly been similarly impossible to compare the utilization of the various operational components during the execution of the two programs, or to determine just where the slower program should be changed to eliminate the slow-up. The present invention, as will appear, permits such a comparison for the first time, and provides a tool giving direct information regarding the relative profitability usage of the various different parts of a data processor so that a particular program can be revised to make more profitable use of a particular part of the processor.

Perhaps the most basic purpose of the apparatus to be discussed hereinafter resides in the analysis of any single program, to determine where that program might be making less efficient use of the machine and thereby causing the machine to be occupied for a greater time than is required by the relevant limiting factor of that machine. The "limiting factor" may be defined as some characteristic, such as the peak speed of a card reader, related to the operation of some known part in the overall processor system, which cannot be speeded up due to limitations in the equipment itself. For example, if the equipment employs a card reader adapted to read five-hundred cards a minute, and if any particular data processing operation requires that five-thousand cards be read, one immediately knows that the machine cannot possibly operate for a shorter period of time than ten minutes in order to process all the necessary data. If we find, however, that a machine having such a card reader, and operating with a particular program, requires eleven minutes to process all of the necessary data, some analysis should (and can, for the first time) be made to determine just what is slowing up the overall operation, so that an effort can be made to reduce the total operating time towards a minimum.

As another practical example, involving the use of the profitability monitoring equipment of the present invention, let us assume that we are using a data processor for invoicing purposes; and let us further assume that a particular number of invoices are to be sent each day. Let us still further assume that, on a particular day, we find that the processor is occupied for twenty minutes to process a particular number of cards, but that on some later day, the processor requires twenty-two minutes to process the same number of cards. By using the apparatus of the present invention, one can determine just where the machine is slowing up, and in what part of the machine the slow-up has occurred. Once it is found that a particular portion of the machine is not being used efficiently, it is a fairly simple matter for a knowledgeable programmer to re-arrange the program slightly to make more efficient use of that part of the machine, so as to speed up the overall processing operation.

It might so happen, for example, that on the first day, the machine was preparing invoices which average five lines in length. It might occur that on the later day, when the slow-up has occurred, the machine is actually preparing invoices which average ten lines per invoice. It might happen that, due to the increased length of the average invoice, the card reader is at rest while the machine is working with a portion of the data. In such circumstances, when the apparatus of the present invention is used it will become immediately apparent that the card reader is not being used at peak efficiency. Under such circumstances, the program can be changed slightly to feed cards to the card reader so that it can be working with certain portions of the data during the time when it would otherwise be idle, and thereby cut down the overall operating time of the machine. This change in the program, which is a fairly simple task for a knowledgeable programmer, will not only increase the efficiency of the machine during its inefficient period (e.g., the twenty-two minute period mentioned earlier), but will also increase the efficiency of the machine during the period when it was believed that the machine was operating at best efficiency (e.g., the twenty minute period mentioned earlier). For example, if the difficulty in the invoicing operation involves preparation of invoice lines in excess of five, the change in program will tend to cut down the time required for the machine to operate whenever an invoice having more than five lines must be prepared. On the first day, when the machine used twenty minutes to process the data, certain of the invoices prepared would have had an excess of five lines; and the change in program would therefore tend to reduce the time needed to process such longer invoices. As a result, in the case where the machine required twenty minutes to process a given number of invoices, the increased efficiency may cut down the total operating time to nineteen minutes. Such a result is of considerable economic importance.

It is accordingly an object of the present invention to provide an apparatus adapted to measure the extent to which specific parts of a computer or data processor system are, or are not, in profitable operation.

A further object of the present invention resides in the provision of a system adapted to measure the efficiency of a given data processor, when operating with a given program, so as to provide data allowing the appropriate determination as to whether, and if so, how, that program should be revised to make better use of the processor equipment.

Another object of the present invention resides in the provision of means for sampling various different electric lines within a computer system, and/or for detecting various different physical movements or conditions within a processor, to effect an analysis of processor operation; and further adapted to provide a display, and/or a recorded analysis, and/or automatic control of the processor equipment based upon the results of the program analysis.

A further object of the present invention resides in the provision of a tool capable of use by persons devising programs to determine the merits of any particular program, and useful in determining just how newly devised or previously known programs should be revised to make better use of a particular processor.

A further object of the present invention resides in the provision of apparatus which may be employed with known data processor equipment, arranged to permit the manual or automatic selection of a particular one of plural possible programs or parts of programs, so as to make most efficient use of that equipment with any particular data then being processed.

A still further object of the present invention resides in the provision of an apparatus capable of use with known data processing equipments, adapted to cut down machine operating time, and further adapted to cause the machine's performance to approach the optimum performance determined by the relevant limiting factors which may come into play during any particular data processing operation.

In providing for the foregoing objects and advantages, the present invention contemplates the provision of a profitability monitoring apparatus adapted to selectively sample various electric lines and/or other portions of a data processor, and arranged to provide a display, record, and/or control signal output related to the efficiency of operation of any one of several different portions of the data processor. In a digital embodiment of the present invention, the sampling may be utilized to actuate counters which provide a measure of the time during which sampling occurred, and which also provide a measure of the time during which any particular portion of the processor was in operation during the sampling interval. Alternatively, in an analog embodiment, the sampling may be utilized to cause some electro-chemical, electro-mechanical, or other effect which can be measured. In particular, it may be used to cause a charge to be accumulated in capacitors. In any case, the resultant information can actuate a display so that, at the end of any particular monitoring period, one using the equipment can immediately know whether or not a particular part of the equipment has been put to best use. The information can, moreover, be utilized to prepare an appropriate record, which can be analyzed later when it is desired to review or revise a given program. The information can, indeed, be employed to permit the automatic sequential selection of different possible programs so that, when it is found that a particular processor is operating at less than best efficiency, alternative programs can be immediately tried in an effort to increase efficiency.

Various different parts of known processors can be monitored in the manner described, and various different factors can be utilized during a sampling interval. By way of example, certain of the parts of the computer system whose profitability can be measured by the equipment of the present invention include card readers, card punches, tape readers and punches, magnetic tape equipment, random access storage units, printers, console units, optical readers, input-output trunks for data transmission, input-output channels for connection between parts of a system or systems, data and/or program transfer lines within the processor, controllers for various devices connected directly or indirectly to the processor, etc. The electric lines which can be sampled, and which carry information relevant for measuring, displaying, and/or recording data involving the operation of a given program, include the lines connecting peripheral devices with controllers, or with input-output trunks, or with input-output channels. The busy status line between the same pieces of equipment may be monitored; and in addition, various portions of the data processing elements of the central processor such as the instruction-interpretation lines initiating an increment of the sequence counter for instruction extraction may further be monitored. Indeed, the electric lines capable of being monitored are of such diverse nature that even the lines controlling the lights on various peripheral consoles can be monitored to good effect.

Sampling, for purposes of profitability monitoring, can also be achieved by detecting movement, or by monitoring the position, of a particular portion of the processor equipment, rather than by monitoring the electrical status of lines within or associated with the equipment. Certain typical parts of known processors which permit such monitoring of movement or position include the drum of a drum-printer, clutch members in card punches, feeds, etc., guide plates for stackers, sprockets on sprocket-controlled paper feed mechanisms, etc.

In one form of the present invention, the monitoring is digital in nature in that individual events are detected and recorded in a digital counter during a monitoring operation. The monitoring may also be accomplished by an analog technique, rather than in a digital manner, however. For example, the charge in a capacitor may be caused to depend upon the number of events which have occurred during a monitoring interval; and this charge can then be used to provide an indication, or a control signal, related to the profitability factor in question. Any other appropriate analog technique or property may also be used for such purposes, as is convenient in any particular case. Terms such as "counter means" and "monitor means" when used hereinafter without further qualification, are accordingly intended to cover both digital and analog devices adapted to operate in the manner described.

The foregoing objects, advantages, construction and operation of the present invention will become more readily apparent from the following description and from the accompanying drawing.

Referring now to the drawing, a central processor has been indicated at 10. This processor may comprise any of many known equipments presently available commercially; and, as is also well known, such a processor may comprise a wide variety of electrical lines, electrical components, and related mechanical components and peripheral equipments, all intended to receive data or other information, and to process such information in accordance with an appropriate program. During such a processing operation, many portions of the overall processor will necessarily come into play; and these parts will operate at different times, and during different time intervals, in dependence upon the nature of the program utilized to control the processing operation. The very nature of the equipments and operations thus involved result in certain portions of the equipment being utilized to less than best efficiency; and this reduction in efficiency in one part or in a few parts of the processor manifests itself in an overall reduction in efficiency of the processor. It, accordingly, becomes important to determine just how these several parts (some of which have been listed previously) are operating during a processing operation, so that an evaluation can be made as to whether a program change will increase efficiency.

For purposes of illustration, let us assume that we wish to monitor the efficiency of the instruction decoder in central processor 10. More particularly, let us assume that central processor 10 includes a storage device 11 having program information stored therein, and that said storage device 11 is associated with an instruction decoder 12 and with an appropriate gating network 13 cooperating with a start pulse source 14. The start pulse source 14 may be appropriately coupled via a control network (generally designated at 15) to the storage device 11; and said start pulse source may further be utilized to enable gate 13 at proper times so as to effect an extraction and decoding of successive items of program information from storage device 11. In general, therefore, the occurrence (or, in some cases, the absence) of pulses from source 14 can be treated as indicating times during which the instruction decoder 12 is in operation. Pulses from source 14 appearing on line 16 may be monitored over a reasonable sampling time period, thereby to determine just how efficiently this instruction decoder portion of the central processor is operating.

In order to effect such monitoring, the line 16 may be coupled to one input of a gate 17 (comprising a portion of the profitability monitoring apparatus of the present invention) via a line 18. Another input to said gate 17 may be derived via line 19 from a free running multivibrator 20 operative to provide sampling signals at a desired repetition rate. A still further input to gate 17 may be derived via line 21 from an enabling source 22, to be described more fully hereinafter.

The output of multivibrator 20 is coupled not only to an input of gate 17, but is also coupled (e.g., via another gate, not shown) to line 23 and to a current elapsed time counter 24. The output of counter 24 is in turn coupled to a display time counter 25, provided essentially to give a reduced counting rate so as to provide a more efficient base for observation. The current elapsed time counter 24 may be arranged to count, for example, a total of thirty bits; and the display time counter 25 may be caused to step one unit for every 256 sampling pulses appearing on line 23. The output of display time counter 25 thus provides a measure of the time interval over which a particular sampling of line 16 has occurred.

The output of gate 17 is coupled to a profitability counter 26; and by the arrangement described, said counter 26 receives an input pulse each time during the sampling period that a particular signal state is monitored on line 16. The output of profitability counter 26 may in turn be coupled to a further display counter 27, which is again provided to reduce the apparent counting rate while maintaining any desired accuracy. The output of display counter 27, which is a counter counting at the same scale as counter 25, will thus give us a measure of time during which the instruction decoder 12 was in profitable operation.

The ratio of the count of counter 27, to the count on counter 25, provides a percentage efficiency measurement for the particular portion of the system being monitored during the sampling period (i.e., during the time that an enabling signal is supplied to gate 17 via line 21). For example, the timing arrangement may be such that the input to the instruction decoder 12 is monitored for a period of one minute (with this one minute monitoring period being ultimately indicated on display time counter 25). It may be found that, during this sampling period, the output of display counter 27 indicates that the instruction decoder was in operation for seven-tenths of a minute. This indicates that the instruction decoder is operating at seventy percent efficiency for the particular data being processed. At some later time, when a different program is in operation, or when different data is being processed, some other percentage efficiency for the instruction decoder portion of the system may be indicated; and a comparison of the data thus derived presents an immediate indication as to the relative efficiencies of the instruction decoder portion of the processor for these different programs and/or for the different data being processed.

If desired, the outputs of counters 25 and 27 may be interconnected to provide a single efficiency indication. In the alternative, the counting time during which a particular sample is being taken can be predetermined so that the gate 17 is automatically closed or inhibited after a selected sampling period has elasped; and in such circumstances, the display counter 27 will itself give a direct indication of percentage efficiency. In any event, and whatever arrangement is employed in connecting the display counters, a figure is measured representing the efficiency of operation for the instruction decoder 12 (or for some other particular part of the central processor being monitored). With information of this type, it is possible for the program to be modified slightly so as to increase the efficient utilization of the instruction decoder (or of the other computer component being monitored).

It will further be noted that, by deriving a percentage profitability figure of the type discussed above, the system permits one to see the effects of a change in program.

For example, if it be determined that the instruction decoder is operating less efficiently than may be desired, the program can be revised in appropriate respects in an effort to increase the efficiency of this portion of the operation. A similar monitoring procedure can then be effected, so as to determine whether more efficient operation has in fact resulted from the program revision. Thus, for the first time, a positive control is provided relating to the efficiency of different portions of an operational program.

The portion of the circuit described above has concerned itself with the monitoring of the profitability operation of the instruction decoder 12. As has already been discussed, a number of other components may enter into any particular data processing operation. It therefore becomes important to permit various different parts of the processor to be monitored as to efficiency, so that all, or the majority, of those components which may be reducing the efficiency of operation can be considered during a program analysis or revision. In a typical case, the system shown in the drawing can be set up to monitor a large plurality of different components in sequence during successive sampling periods; and information will then be provided as to the profitability figures of merit for each of the several components monitored, so that a program change can be completely evaluated, and so that it can be properly determined that an increase in efficiency of one part of the system, effected by a program change, is not accomplished at the expense of efficient operation in some other part of the overall system.

Further, the measuring of more than one component can greatly assist the control and accounting procedures involved in the operation of data processors which can concurrently operate on more than one program—commonly called multi-programing. In this mode of operation, the data processor generally operates under the control of an executive program which allocates the data processing facilities and the input-output facilities to the different resident programs in accordance with pre-arranged formulas inserted by the executive program writers. As of now, these formulas do not effectively take into account the actual dynamic situation as can be reflected by the use of the present invention, and so do not necessarily achieve the most effective use of the data processor.

Further, when it comes to considering the problem of allocating charges to specific programs being executed in this manner, no certain way presently exists to equitably allocate these charges. As a result of this uncertainty, which in some cases has caused the concept of multi-programing to be abandoned, the action of a programer placing a job in the job stack ready for operation is often the equivalent of signing a blank check. However, with the information available from the use of the present invention, it is possible both for the programer to control the environment in which he is prepared to have his program run, thereby returning to him normal control of his actions, and/or for the executive program to adopt more sophisticated operational and accounting formulae which avoid these difficulties.

In order to provide sequential monitoring of this type, an enabling source 22 can be provided to control the input to the profitability counter 26. This provides a switch which arranges for the effective coupling of the monitoring equipment to successively different parts of the central processor in any desired sequence. In the illustrative showing of the drawing, the enabling source 22 is depicted as a switching arrangement comprising a switch blade 28 coupled to a potential source 29 and movable from one to the next of a plurality of different fixed contacts 30. Each of the contacts 30 are in turn connected to an enable line providing an enabling input to a particular one of a plurality of different gates, depending upon the position of switch blade 28. For example, in the position shown in the drawings, the switch blade 28 is coupled to a terminal 30 which is in turn connected to line 21 providing an enable input to gate 17; and for this position of switch blade 28, therefore, the instruction decoder 12 can be monitored in the manner already described.

A plurality of other gates, arranged in a manner generally similar to gate 17 (but having different inputs) can also be provided. One such gate is shown at 35, and another such gate is shown at 36; and each of these gates derives an input from a preselected different portion of the central processor 10. It will be appreciated, of course, that any reasonable number of such gates can be provided, to permit the monitoring of all the various different parts of the data processor which may enter into the efficiency of operation of an overall data processing operation.

Gate 35 has an input line 37 which is coupled to the printer (generally designated at 38) of central processor 10. This same gate 35 has a further input line 39 coupled to line 19 whereby sampling signals can be derived from multivibrator 20; and, in addition, gate 35 has a still further enable input 40 coupled to one of the terminals 30 in the switching arrangement comprising the enable source 22. When line 40 is enabled, therefore, line 21 of gate 17 is simultaneously disabled; and, as a result, the gate 35 provides output signals to the counter arrangement 26, 27 at the same time that multivibrator 20 supplies timing signals to the counter arrangement 24, 25, whereby the system operates to monitor the efficiency of operation of the central processor printer 38.

The gate 36 is arranged to operate in an entirely similar manner, except that it derives one of its inputs from the central processor card reader generally designated at 41. More particularly, after the printer 38 has been monitored for a reasonable sampling period, the switch 28 can be moved so as to couple source 29 to an enable line 42 associated with gate 36. The multivibrator 20 is coupled to another input of gate 36 via line 43; and a still further input line 44 of gate 36 is coupled to the aforementioned card reader 41 of central processor 10. A a result, this movement of switch blade 28 disables the other parts of the monitoring system, and causes the counters 24–27 inclusive to count, and provide a figure of merit, for the profitability operation of the card reader 41.

It will be appreciated, of course, that the enable arrangement 22, which is shown to be a mechanical arrangement in the drawing, can actually take the form of an appropriate electronic switching arrangement; and it will further be appreciated that the switching from one to another portion of the processor 10 for purposes of monitoring different parts of the processor, can be accomplished automatically in successive increments of time, rather than manually in the manner depicted. The several counters 24–27 inclusive can, where required, be reset or cleared subsequent to each profitability measurement, and prior to commencement of a next profitability measurement for a different part of the processor; and this can be accomplished either manually or automatically, i.e., the movement of switch 28 from one to a different terminal 30 can be arranged to automatically provide a clearing signal to the several counters 24–27 inclusive.

A plurality of other control sources, similar to enabling source 22, can be provided for various other relevant purposes. In the same way that source 22 controls which operating component of the data processor shall be connected at any one time to the monitoring apparatus, other enabling or inhibiting sources can control the environment in which monitoring shall take place. In particular, such sources can allow monitoring of the operational efficiency of a specific operational component to take place only when some other operational component was not in operation. Then by taking a further monitoring sample of the operation of that same component when the second operational component is in operation, a form of analysis of the operational characteristics of the program presently being executed can be made, which analysis can help a programmer in locating the cause of some operational inefficiency.

In order to provide for control of this type, enabling source 62, switch blade 68, potential source 69 and fixed contacts 70 have been illustrated in the drawing, operating respectively in a manner similar to enabling source 22, switch blade 28, potential source 29 and fixed contacts 30. Lines 61, 70 and 72, which are analogous to lines 21, 40, and 42, connect specific contacts 70 to gates 17, 35, and 36, respectively, thereby controlling the environment of the operation of profitability counter 26. Such a control might apply only to lines entering the profitability counter 26, or to lines entering the current elapsed time counter 24, or to both counters.

In the arrangement thus far described, it will be noted that the monitoring apparatus samples and determines the efficiency of one given part of the system at any one particular time. Actually, the counter arrangement 24–27 may be duplicated for the various different parts of the system to be monitored, so that more than one part of the system may be monitored for efficiency at a given time. It will be further appreciated, from the prior discussion, that the monitoring can be effected by using a digital arrangement, or by using an analog arrangement, or by actually sensing various different types of parameters including both electrical and mechanical parameters.

A profitability monitoirng arrangement of the type shown in the accompanying figure can be incorporated into a display console associated with presently existing central processor equipment, with the various lines of the profitability monitor being coupled to the various appropriate lines or other signalling locations in the data processor. In the alternative, the monitoring arrangement can constitute a separate piece of equipment, portable in nature, which can be connected up to any given data processor when it is desired to check a program or programs being executed on that particular processor, and to monitor the efficiency of operation of the various processor components.

It should also be noted that, since the profitability monitoring arrangement shown in the accompanying figure comprises in large part components which already exist in conventional data processing equipment (e.g., counters, gates, signal sources, etc.), the monitoring arrangement may utilize components which already exist as part of the central processor. In such a case, an appropriate monitoring program can be written to utilize these pre-existing components. Some rewiring may be required to provide the necessary inputs to the various counters, etc., but in general such rewiring would be minimal in nature. The program written to permit such utilization of pre-existing processor components would, in effect, cause such pre-existing components to have dual functions during different time intervals. For example, an appropriate program could be written stating, in effect, that at certain times, when a particular counter is not otherwise occupied, it can function as a profitability counter; and signals appearing on a particular line could, during an appropriate sampling time interval, be coupled to that dual-purpose counter. The other parts of the system could be similarly provided by pre-existing components, and an appropriate program written to take the dual purpose of these other components into account as well.

Actually, such use of pre-existing computer components for profitability observation may be less than desirable; and it is, accordingly, preferred that the profitability monitoring equipment take the form of a separate piece of apparatus, as has already been described. More particularly, it will be appreciated that by devoting certain pre-existing components in the processor 10 to the measurement of profitability, we may, at the same time, detract from the overall efficiency of the data processing equipment; and parts which could presumably be employed profitably for data processing operations, may actually have to be devoted for profitability measurement when such dual functions are accorded to these several parts. The use of pre-existing processor components to make profitability measurements may, therefore, adversely reflect upon the very profitability measurements being made. Therefore, for best accuracy in the making of profitability measurements, it is preferable to provide the monitor as a separate piece of equipment.

The arrangement thus far described has provided an indication of profitability on counters 25–27. Such counters may be supplemented, if desired, by recording equipment adapted to give a permanent record of sequential profitability measurements, and such records can then be reviewed as desired. A record of this type, supplemented as desired by data transmitted from the central processor which shows the present program execution position, will indicate, to a proper time scale, just how the various different parts of the central processor were operating, as to profitability, during a particular routine; and this will allow the identification of the changes in the program as may be required to increase the profitability of operation of particular parts of the central processor. Such records, therefore, comprise a tool which programmers may employ in developing more sophisticated programs, or in refining existing programs.

A recording operation of the type described may be accomplished by coupling control components to the outputs of the several counters 24–27; and such components have been shown in the drawings as a secondary computer 50. Computer 50 may be provided with a plurality of busses 51–54 inclusive, coupled to the several counters 24–27 inclusive, and arranged to provide clearing signals to the various counters 24–27 after each profitability measurement has been completed. In addition, the several busses 51–54 inclusive may be caused to transfer counts from the counters 24–27 inclusive to computational elements in the computer 50, and appropriate arithmetic and/or logical operations may be effected on these counts to provide an output signal indicative of profitability for coupling via a line 55 to an appropriate recorder. The term "recorder" as employed herein, is intended to cover a variety of possible output equipments, including magnetic recorders, punching equipment, typewriters, optical recorders, etc. The records thus made, in fact, can take the form of managerial reports adapted to indicate the results of an overall monitoring operation, and useful to programmers at a later date in analyzing the processor operation.

When records of the types described are made, the display counters 25 and 27 can be eliminated. Actually, however, the output counters 25 and 27 can be used along with the secondary computer 50 when desired, so that an immediate visual display can be given at the same time that more sophisticated operations are being accomplished.

The secondary computer 50 can incorporate its own display if desired; and this has been indicated by the output display line 56. In addition, when a secondary computer such as 50 is provided, this computer may comprise more than mere computational elements, and can in fact include components responsive to signals appearing on an input bus 57 (or on a bidirectional bus 58) to initiate the monitoring operation, to effect such monitoring in a particular sequence in relation to particular different parts of the data processor 10, and to provide appropriate data on the program execution position in processor 10, data for displays and records, etc. During the monitoring of profitability, the secondary computer can, moreover, operate to provide signals on bus 58 related to the actual profitability measurements being made, and operative to feed back appropriate control information to the central processor 10 so as to initiate a change in program in central processor 10 when it has been determined that the operating efficiency of the central processor 10, or of some particular part thereof, have fallen below desired norms.

More particularly, an instruction may be supplied to secondary computer 50 on bus 57 creating a request that the secondary computer 50 measure particular current operating efficiencies for selected parts of the central processor 10. Computer 50, in response to reception of such an instruction, may provide clearing signals via busses 51 and 53 to clear counters 24 and 26 (and may also provide such clearing signals via busses 52 and 54 to counters 25 and 27, if these counters 25 and 27 are provided). The counters 24 and 26 will thus be conditioned to start anew at a point at which the central processor 10 has instituted a specific way of handling the input-output. The secondary computer 50 can be internally programmed to initiate a sequential profitability monitoring of the type previously accomplished by the enable switch arrangement 22; and successive measures of profitability can be made and stored in the secondary computer 50 during its profitability measuring routine. After an adequate time interval, determined by the secondary computer 50, has elapsed, to insure uniformity of results, the central processor 10 can note the readings then stored in the secondary computer 50, relating to the current profitability of operation of the central processor 10.

The central processor 10 may be provided with a plurality of alternative programs or routines stored in its program storage device 11. After a particular profitability measurement has been effected by secondary computer 50, the central processor 10 can re-instruct secondary computer 50, via instruction input bus 57, to test out a number of alternative routines stored in the central processor 11. A similar sequence of operation can then be effected for each of the several stored programs or routines in central processor 10, with the central processor 10 appropriately noting the profitability figure for each of these several routines. At this point, the central processor 10 may select the most adequate or most profitable one of the alternative routines, and can then inform the secondary computer that future profitability should not fall below a specific level, this being the level at which the central processor is assuming the profitability of the particular set of operational routines.

In effect, therefore, the main processor 10 is adapted to switch itself automatically from one to a different routine, all intended to produce the same end result, in an effort to achieve the most efficient operation. After one routine has been tried, if the profitability measurement as monitored by secondary computer 50 in association with counters 24 and 26, indicates that the central processor 10 is not operating at best efficiency, the secondary comupter 50 can then automatically cause the primary computer 10 to select an alternative routine, or a series of alternative routines in sequence. In this manner, the overall arrangement permits the primary computer to select the best routine needed to accomplish a particular desired end result.

While I have thus described preferred embodiments of the present invention, many variations will be suggested to those skilled in the art; and certain of these variations have, in fact, been discussed in the preceding description. It must, therefore, be understood that the description given above is intended to be illustrative only and should not be considered limitative of my invention; and all such variations and modifications as are in accord with the principles described are meant to fall within the scope of the appended claims.

Having thus described my invention, I claim:

1. An apparatus for analyzing the operation of a data processor, for use with a data processor having a plurality of different operational components each of which is adapted to provide a sensible characteristic manifestation indicative of its operating status and each of which operational components is adapted to be brought into operation at appropriate times in accordance with a predetermined program, said analyzing apparatus comprising counter means, switch means for selectively coupling said counter means to different ones of said data processor operational components in a desired sequence for counting the sensible operating status manifestations of selected ones of said operational components in sequence, timing means responsive to operation of said switch means for determining the time interval during which said counter means monitors the operating status of each of said operational components, and output means jointly responsive to said counter means and to said timing means for determining the percentage efficiency of operation of said selected ones of said operational components during a selected monitoring time interval.

2. The apparatus of claim 1 wherein said counter means comprises a digital counter.

3. The apparatus of claim 1 wherein said switch means comprises a plurality of gating means each of which has an input coupled to a different one of said operational components respectively, said gating means each having a further control input, means for selectively enabling different ones of said gating control inputs in sequence, and means coupling the outputs of said gating means to said counter means.

4. The apparatus of claim 3 wherein said timing means comprises further counter means, a source of timing pulses, and means coupling timing pulses from said source to said further counter means and to said gating means, whereby said first-mentioned counter means and said further counter means register counts of pulses derived from the same source.

5. The apparatus of claim 1 wherein said output means comprises visual display means.

6. The apparatus of claim 1 wherein said output means includes recorder means.

7. The apparatus of claim 1 wherein said data processor includes means storing a plurality of different programs, said output means including means for controlling the initiation of different ones of said programs in response to said percentage efficiency determination.

8. An apparatus for analyzing the operation of a data processor, for use with a data processor consisting of a plurality of different operational components each of which is adapted to generate a characteristic signal indicative of a characteristic operating state and each of which components is adapted to assume said characteristic operating state at appropriate times during performance of a predetermined program, said analyzing apparatus comprising signal responsive monitoring means, means coupling said monitoring means to a selected one of said data processor operational components for counting the number of times said selected component assumes said characteristic operating state during a selected time interval, and means operative upon elapse of said selected time interval for decoupling said monitoring means from said selected component and for coupling said monitoring means to a further one of said operational components thereby to monitor the operating states of said further component for a succeeding time interval.

9. The apparatus of claim 8 including display means coupled to said monitoring means for providing a visual display of the results achieved by said monitoring operation.

10. The apparatus of claim 8 including recorder means coupled to said monitoring means for providing a continuous record of said succeeding monitoring operations.

11. The apparatus of claim 8 including control means coupled to said monitoring means and operative to vary said predetermined program of said data processor in response to the occurrence of predetermined results during said monitoring operation.

12. In combination, a data processor comprising a plurality of different operational components each of which is adapted to provide a sensible manifestation characteristic of its operating status, program means having a program stored therein, means responsive to said program means for initiating operation of said components at appropriate spaced times; an apparatus for analyzing the operation of said data processor comprising monitor means responsive to said manifestations for counting the number of times each of said components is rendered operative during a selected time interval, and output means coupled to said monitor means for indicating the percentage efficiency of operation of said operating components during performance of said program.

13. The apparatus of claim 12 wherein said output means includes visual display means.

14. The apparatus of claim 12 wherein said output means includes recorder means.

15. The apparatus of claim 12 wherein said output means includes control means for selectively controlling the initiating operations of said program means.

16. The apparatus of claim 12 including means for coupling said monitor means to different ones of said operational components during different successive time intervals.

17. An apparatus for analyzing the operation of a program in a data processor, for use with a data processor having program means controlling the operation of a plurality of different operational components each of which components is adapted to provide sensible manifestations indicative of its operating status and each of which components is adapted to be brought into operation by said program means at appropriate times in accordance with the program being analyzed, said analyzing apparatus comprising signal responsive monitor means, switch means for selectively coupling said monitor means to different ones of said data processor operational components in a desired sequence for counting the number of times each of said components is rendered operative by said program means during a predetermined sampling time interval, and output means coupled to said monitor means for indicating the percentage efficiency of operation of said operating components during performance of said program.

18. An apparatus for measuring the characteristics of the execution of a program on a data processor, for use with a data processor having program means controlling the operation of a plurality of different operational components and further including means providing sensible manifestations indicative of the operating status of various of said operational components during execution of the program, said measuring apparatus comprising signal responsive monitor means coupled to said manifestation providing means and responsive to the said sensible manifestations of operating status of said operational component for monitoring the execution of said program, said monitor means including means for comparing the monitored program execution with a reference parameter to provide a measure of the characteristics of said program execution, and output means coupled to said monitor means for providing a sensible manifestation of the results of said measure of program execution characteristics.

19. The apparatus of claim 18 wherein said monitor means comprises a digital device.

20. The apparatus of claim 18 wherein said monitor means comprises an analog device.

21. The apparatus of claim 18 wherein said monitor means includes counter means and timing means, for counting the number of times at least one of said components is operative during a selected time interval, said selected time interval comprising said reference parameter.

22. The apparatus of claim 18 including control means for coupling said monitor means to said sensible manifestation providing means, said control means including means operative to select between different ones of a plurality of said sensible manifestations.

23. The apparatus of claim 22 including further control means for coupling particular sensible manifestations to said monitor means only if a specific condition is present as defined by other of said sensible manifestations.

References Cited

UNITED STATES PATENTS

| | | | |
|---|---|---|---|
| Re. 25,658 | 10/1964 | McKenna | 235—92 |
| 3,275,987 | 9/1966 | Mann | 235—92 |
| 3,344,408 | 9/1967 | Singer | 235—92 |

MAYNARD R. WILBUR, *Primary Examiner.*

G. J. MAIER, *Assistant Examiner.*